Figures 1, 2A, 2B, 2C, 2D, 3, 4A, 4B, 5:
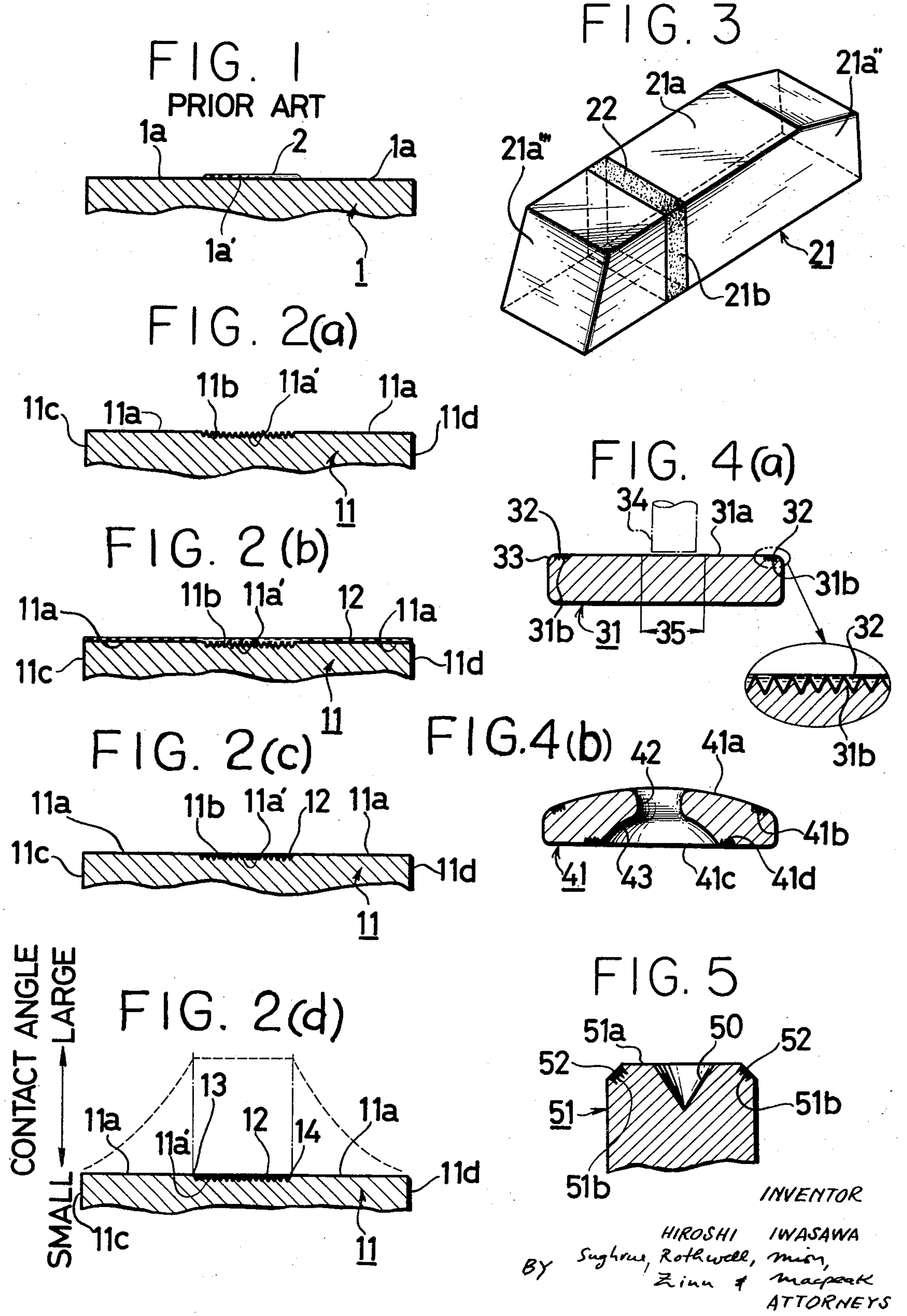

United States Patent [19]

Iwasawa

[11] 3,709,324

[45] Jan. 9, 1973

[54] PROCESS FOR THE PREVENTION OF UNINTENTIONAL ESCAPEMENT OF AN APPLIED OIL LAYER

[75] Inventor: Hiroshi Iwasawa, Kawasaki, Japan

[73] Assignee: Citizen Watch Company Limited, Tokyo, Japan

[22] Filed: March 23, 1971

[21] Appl. No.: 127,101

[30] Foreign Application Priority Data

March 23, 1970 Japan ................................45/24227

[52] U.S. Cl. ......................184/1 E, 308/1 R, 308/3.5

[51] Int. Cl. ..............................................F16c 33/12

[58] Field of Search ........308/241, 1 R, 3.5; 184/1 R, 184/1 E; 117/49; 29/149.5 NM

[56] References Cited

UNITED STATES PATENTS

| | | | |
|---|---|---|---|
| 2,693,458 | 11/1954 | Olson | 260/2 M |
| 3,077,368 | 2/1963 | Pignone | 184/1 R |
| 3,465,014 | 9/1969 | Pavlik | 260/2 M |

*Primary Examiner*—Mandel A. Antonakas
*Attorney*—Sughrue, Rothwell, Mion, Zinn & Macpeak

[57] ABSTRACT

A process wherein an elongated area selected in proximity to the bearing surface of a bearing member is roughened in comparison with other area encircling partially or wholly the bearing surface, an oil-repulsing polymer is applied to the overall surface of said member, said polymer is substantially or wholly removed from other surface area than said roughened surface, and then the member is subjected to thermal influence at an elevated temperature selected lower than the decomposition temperature of said agent thereby the latter being caused to creep around from said roughened area, especially towards the bearing surface.

2 Claims, 5 Drawing Figures

INVENTOR
HIROSHI IWASAWA
BY Sughrue, Rothwell, Mion, Zinn & Macpeak
ATTORNEYS

PROCESS FOR THE PREVENTION OF UNINTENTIONAL ESCAPEMENT OF AN APPLIED OIL LAYER

This invention relates to improvements in and relating to a process for the prevention of unintentional escapement of lubricating oil from the bearing surface of a bearing member, such as bearing jewel which may be of the radial or thrust type, escape pallet or the like parts, frequently used in timepieces or the like small and fine mechanical equipments or instruments, although there are set forth only by way of example; and a mechanism for carrying out the said process.

It is commonly known to prevent unintentional escapement of lubricating oil from the bearing surfaces applied with the oil by such a measure that a barrier strip or zone is provided on a bearing member in close proximity of the bearing surface by applying the barrier zone partially or wholly enclosing the bearing surface, with certain non-wetting agent, having strong oil-repulsing characteristics.

It has been practically experienced that it is highly difficult to apply such a limited area destined for the establishment of said oil-repulsing barrier with the non-wetting agent, especially on the fine and miniature bearing elements, especially when viewing from the mass productive point of view.

It is therefore the main object to provide a highly efficient process and mechanism for providing highly improved oil barrier, especially adapted for mass production thereof.

According to a prior proposal, the overall surface, including the bearing surface, of the bearing member is coated with the oil-repulsing polymer agent. With the employment of such measure, it has been experienced that the effective oil-repulsing performance against unintentional oil escapement is substantially decreased, in addition to the thus invited fouled appearance of the bearing member.

A further object of the invention is to provide a process and a mechanism capable of obviating such conventional drawback.

It is a still further object of the invention to provide a process and a mechanism of the above nature, yet representing a slope of the contacting angle with the oil applied onto the bearing surface.

The process according to the present invention in its broadest sense resides in such that an elongated area selected in proximity to the bearing surface of a bearing member is roughened in comparison with other area encircling partially or wholly the bearing surface, an oil-repulsing polymer is applied to the overall surface of said member, said polymer is substantially or wholly removed from other surface area than said roughened surface, and then the member is subjected to thermal influence at an elevated temperature selected lower than the decomposition temperature of said agent, thereby the latter being caused to creep around from said roughened area, especially towards the bearing surface.

The mechanism realized by the foregoing process resides in such one, comprising in combination, a roughened surface area formed on a bearing member and in proximity to the bearing area of the latter, and a thin baked film of an oil-repulsing polymer or copolymer applied on said roughened surface area and creeped around therefrom, especially towards said bearing surface.

As the non-wetting and oil-repulsing agent, tetrefluoro-ethylene polymer, fluorinated ethylene propylene copolymer or their functionally equivalents and/or derivatives can among others most advantageously be used.

These and further objects, features and advantages of the invention will become more apparent when read the following detailed description of the invention in a comparative way with comparative and conventional prior art and by reference to the accompanying drawings.

In the drawings:

FIG. 1 is a schematic longitudinal view of a bearing member shown in a highly simplified form, illustrative of the conventional comparative oil-repulsing barrier technique.

FIG. 2 at (a), (b) and (c) represents substantially similar views to FIG. 1, yet illustrative of several successive steps for the formation of the oil-repulsing barrier according to the present invention.

FIG. 2 at (d) is a similar view to FIG. 2(c), illustrative of an example of variation of the contact angle of the oil-repulsing layer as established according to the invention, with lubricating oil, and varying mode being plotted against the axial length of the bearing member.

FIG. 3 is a perspective view of an escapement pallet formed with the oil-repulsing barrier mechanism according to this invention.

FIG. 4 at (a) and (b) represents thrust and radial bearings used in a timepiece, respectively, yet being fitted with an oil barrier mechanism according to this invention.

FIG. 5 is a schematic longitudinal section of a timepiece bearing having a cone bearing recess and fitted with an oil barrier mechanism according to this invention.

Before entering into detailed description of the invention, a brief and preliminary explanation of a closest prior art will be given hereinbelow.

In FIG. 1, numeral 1 generally represents an elongated bearing member treated in accordance with the conventional technique, preferably artificial jewel, shown in its schematic longitudinal section, which is commonly used in the timepiece industry. A part 1*a'* of the surface of the member 1 is covered with a thin film 2 consisting of an oil-repulsing polymer agent of non-wetting nature, such as "TEFLON" manufactured and soled by Du Pont, so as to provide an oil-repulsing barrier, by the coating process. When using, the barrier film 2 will serve as such for the prevention of passage of lubricating oil, not shown, as applied on the remaining plain surface areas 1*a* for checking a free movement of the oil across the barrier which represents, however, various drawbacks hereinabove referred to. In addition, such barrier is liable to separate from the deposited area, for instance, when subjected to frequent cleaning processings, as may be encountered when the timepiece is cleaned. A considerable difficulty may be encountered during the formation of such barrier, because the bearing member is coated provisionally with the barrier polymer or copolymer in position, and indeed, by the dipping process or the like conventional method and then the superfluously applied oil over the idle surface areas such as shown at 1*a* must be removed in any suitable selected manner.

For the formation of a barrier film layer 12 on a similar bearing member 11 according to this invention, the latter is modified with a roughened surface area 11*a'*, the surface roughness intentionally provided being shown clearly, or rather in a substantially exaggerated way at 11*b*. Then, the bearing member 11 is applied on its entire surface including said roughened surface area 11*a'* with a coat of oil-repulsing polymer substance which may be similar to those referred to hereinbefore and relying upon the conventional dipping or coating technique. The thus coated state of the bearing member can be clearly understood from FIG. 2 at (b). Then, part of the polymer substance is removed off from the areas 11*a*, thereby leaving to remain the deposited film part on the roughened area 11*a'*, although not specifically in the related figure at (c) of FIG. 2. Then, the polymer film 12 is dried up. The removal procedure may be easily carried out, by relying upon the conventional wiping-out procedure or the like. The wipe-out operation is carried out so that the oil-repulsing polymer agent 12 remains only a small amount at the roughened surface area 11*b*.

In the next step, the member 11 as a whole is heated up to such a temperature that part of the polymer agent 11*b* creeps from the roughened area 11*a'* to the plain or the now cleared surface areas 11*a* which is covered practically as a whole by the agent which represents, as a result of the thermal creeping phenomenon, such that although the contact angle of the thin layer of said agent 11*b* with lubricating oil which is applied to the remaining surface area 11*a* before or during use of the bearing member 11 although not shown, is practically constant [see, dotted straight line in FIG. 2 (c)], the contact angle will gradually be reduced as the distance from the marginal line(s) 13;14 defining the periphery of said roughened area increases as measured from the marginal line(s) outwardly. The mode of variation in the contact angle may be clearly understood by observing the inclined dotted lines shown in FIG. 2(c). Thanks to the thermal creeping phenomenon of the polymer agent 11*b* from the roughened area 11*a'* to the neighboring plain or unroughened areas 11*a*, these latter plain areas represent a clean and attractive appearance and a superior oil-repulsing characteristics. The bearing surface may be that shown at 11*c* or 11*d*. Under circumstances, part of the surface(s) 11*a* may be utilized as the bearing surface.

In the second embodiment of the invention shown in FIG. 3, illustrative of an escapement pallet generally shown at 21, the numeral 22 represents a barrier area roughened and covered with an oil-repulsing polymer agent as before, said area 22 being defined by a narrow and closed strip selected within side surfaces 21*a* of the member 21 and encircling laterally thereof as shown. Numeral 21*b* hints the roughened surface zones which will be exposed to visual eyes in advance of the application of the polymer agent thereonto. This is only for the comparison purpose of the present embodiment with the foregoing shown in FIG. 2. Numeral 21*a''* represents such a part of the member 21 or pallet stone which is to be embedded in the material of the related anchor arm, not shown. The surface area denoted 21*a'''* represents the tip end surface on the pallet stone which is utilized as the working or bearing surface thereof and to be oiled before or during the practical use of the stone.

The application of the polymer agent substantially and practically onto the roughened area(s) 21*b* may be performed as in the foregoing embodiment so that a detailed description thereof has been omitted from the present description.

During the baking stage of the polymer agent, the latter will creep from the applied area 22 into the neighboring area(s) 21*a* towards the parts 21*a''* and 21*a'''* by the thermal creeping phenomenon. But, it should be noted that the bearing surface 20a''' is left blank without affected by the crept-out agent. When observed axially along the whole length of the surface(s) 21*a*, the variable characteristics of the contact angle with oil may be similar to that shown and described in the foregoing first embodiment by reference to FIG. 2(c).

In FIG. 4 at (a), a third embodiment of the invention in the form of a thrust bearing member, preferably made of artificial stone as is commonly employed in the timepiece industry. This thrust bearing stone, generally shown at 31, is formed on the upper surface 31*a* thereof and at a close proximity of the marginal peripheral edge 33 thereof with a ring-shaped surface zone 31*b* roughened in the manner as was referred to hereinbefore.

Application and baking of the oil-repulsing polymer agent 32 may be performed substantially in the same way as before. In this embodiment, the effective thickness of the polymer agent preparatorily applied over the whole area of the upper surface 31*a* is so selected to such amount that upon baking and creeping thereof, a central bearing area denoted 34 is left uncoated by the creeped polymer. In this way, a rotatable member such as an arbor schematically and partially shown only by an imaginary line 34 can be received and kept in contact with lubricating oil, not shown, applied on the uncovered plain surface area 35 serving as the thrust bearing one. In this embodiment, the polymer agent 32 will creep towards such bearing surface 35 from the outer barrier zone 31*b*.

At FIG. 4(b), a fourth embodiment of the invention taken in the form of a radial bearing stone, generally shown at 41 is illustrated. In this embodiment, the radial bearing stone 41 is formed axially with a central bearing bore 42, a convexedly curved outer surface 41*a*, a concavely curved inner surface and a plane ring-shaped bottom surface 41*c* as shown and as highly well known among those skilled in the art. An upper and a lower ring-shaped oil barrier zone 41*b* and 41*d* are provided on the upper and bottom surfaces 41*a* and 41*c*, respectively. The upper one 41*b* is provided in close proximity to the outer peripheral edge of the outer surface 41*a*, while the lower one 41*d* is positioned in close proximity to the inner peripheral edge of the bottom ring surface 41*c*. These oil barrier zones are roughened, coated with polymer agent, and then baked for the creeping purpose as before. Specific structure of these barrier zones is similar to that shown at 31; 32 so that more detailed analysis thereof can be omitted without interferring better understanding of the nature of the invention.

It will be easily seen that the creeped barrier agent can cover precisely or substantially cover the upper or outer surface 41*a* and the inner surface 43 of the bearing member 41, excluding the cylindrical bearing surface established by the provision of bore 42. The specific effect provided by the provision of the creeped-out polymer film is as before.

Finally, a fifth embodiment of the invention will now be described hereinbelow by reference to FIG. 5. In this embodiment shaped into a combined radial and thrust bearing stone, generally shown at 51, is formed in its upper part with a cone-shaped bearing recess 50. On the bevelled upper marginal ring-shaped edge of the upper ring surface 51*a* of said member 51, a ring-shaped barrier zone 52 is provided. The nature and structure of this zone 52 is substantially same as before, especially as was described in detail with reference to the barrier zone 31; 32. It will be therefore seen that a creeped barrier layer having a variable contact angle characteristic relative to oil is formed on the upper ring surface 41*a*. The effect thereby attained will be self explanatory, upon read the foregoing description of the present embodiment, together with those of the foregoing several embodiments.

Throughout all the embodiments of the invention, the roughening process may be relied upon the conventional grinding, etching and the like technique. As may be supposed by the description of the last embodiment, the artificial and intentional roughened zone may be replaced by the conventionally formed rough edge zone defining certain surface area and established during the manufacture of bearing stones in a factory.

Thanks to the gradual variation of the oil-repulsing effect, smaller to larger, appearing when observing from the bearing zone as a starting point will provide such effect that a gradually and corresponding degree of oil application on the creep agent-covered surface in proximity of the oiled bearing zone will be positively realized.

Under these conditions, a provisionally or permanently off-set bearing conditions of the rotating member such as arbor may well be tolerated by providing a necessary and successful bearing effect to the member.

In the following, a preferred numerical example will be given for still better understanding of the nature of the invention.

EXAMPLE 500 pieces of conventional radial bearing stones as shown at (b) of FIG. 4 were placed in a wire net cage which was dipped in a treating bath consisting of benzine or the like conventional cleaning solvent medium and subjected to a supersonic cleaning action for about 3 minutes by use of a conventional machine commonly used for this purpose (150 W; 400 kc).

Then, the case with stones was dipped in a ligroine bath for carrying out an after-treatment and dried up by subjecting the cleaned stones to hot air streams.

Next, a liquid mixture of non-wetting agents was prepared by mixing 100 wt. parts of FEP resin (TEFLON PRIMER) 856–301 or 851–204 or 856–301 with 40 wt. parts of VM 7799, these being manufactured and sold by Du Pont, Wilmington, Del., U.S.A., by throughly and intimatingly agitating and mixing together.

This resin polymer mixture was diluted with 40–50 times, by volume, of distilled water, so as to provide a dipping bath.

The aforementioned cleaned stones were dipped in the last mentioned bath for at least 10 seconds at normal temperature, then lightly centrifuged so as to remove excess liquid and then wiped out by means of a soft cloth piece by piece. Then, the thus coated stones were preparatorily dried in the open air at a temperature lower than 100°C, preferably at 50°–70°C for about 7 minutes.

The thus dried-up stones were subjected to a baking step at 360°–390°C for about 10 minutes, quenched in cold water and dried up at an elevated temperature lower than 100°C.

Then, the thus baked stones were subjected to a tumbling step for about 30 minutes and finally cleaved by the conventional ultrasonic cleaning technique.

In this way, the desired products were provided.

As for the preparatory roughening operation, an example of etching process will be given.

The stones, before the first ultrasonic treatment, were applied with a heat-resistant coating of any suitable nature and on the whole surface of each of said stones by the dipping process. The barrier zone on each stone piece was mechanically removed. Then, whole of the stones was dipped in an etching bath containing 2HF; $H_2SO_4$ and $H_2O$ in a ratio of 1:1:1 and heated up to 90°C, for about 60°C. In this way, the barrier zone was formed in the appearance of a mat glass.

In place of the etching process, a grinding step was employed. The emery powder was of mean particle size 20–24 microns. The roughness of the roughened surface had mean undulations of 0.2 micron.

The embodiments of the invention in which an exclusive property or privilege is claimed are as follows:

1. A process for the prevention of unintentional escapement of lubricating oil from a bearing surface of a bearing member comprising the steps of roughening an area adjacent to said bearing surface, applying an oil-repulsing polymer to the overall surface of said member, removing said polymer from all surface areas other than said roughened surface, and subjecting said member to an elevated temperature selected lower than the decomposition temperature of said polymer whereby the latter is caused to creep outwardly from said roughened area toward said bearing surface without covering said bearing surface.

2. A process as set forth in claim 1 wherein said roughened area is extended to completely surround said bearing surface.

* * * * *